(12) United States Patent
Perlman

(10) Patent No.: US 6,258,430 B1
(45) Date of Patent: Jul. 10, 2001

(54) PORABLE PARKING MAT AND BERM

(76) Inventor: Richard I. Perlman, 4698-A Alvarado Canyon Rd., San Diego, CA (US) 92120

( * ) Notice: Subject to any disclaimer, the term of this patent is extended or adjusted under 35 U.S.C. 154(b) by 0 days.

(21) Appl. No.: 09/479,278

(22) Filed: Jan. 5, 2000

(51) Int. Cl.$^7$ ....................................... B32B 3/06
(52) U.S. Cl. ........................... 428/57; 428/192; 296/38; 184/106; 180/69.1; 220/573
(58) Field of Search ................. 428/57, 99, 192; 296/38; 184/106; 180/69.1; 220/573

(56) References Cited

U.S. PATENT DOCUMENTS

| | | | |
|---|---|---|---|
| 5,308,670 | 5/1994 | Saylor | 428/81 |
| 5,556,692 | 9/1996 | Zheng | 428/156 |
| 5,916,658 | 6/1999 | Mohr | 428/81 |
| 5,948,250 | 9/1999 | Middleton | 210/232 |

*Primary Examiner*—Alexander S. Thomas
(74) *Attorney, Agent, or Firm*—Fitch, Even, Tabin & Flannery

(57) ABSTRACT

A portable parking mat and berm of modular construction which allows easy assembly and assures secure retention of liquids dripping from the undersurface of a vehicle. The four edges of a flexible rectangular sheet are individually supported a desired minimum distance above the surface of a garage floor through the use of modular structures installed in end-to-end alignment. One-piece integral side structures are quickly located in alignment along the lateral edges of the sheet and installed through the employment of interengaging parts that secure the flexible sheeting therebetween. Similar structures may be used at the head end, while at the entrance end two-piece modular structures are provided that provide sloping front and rear ramp surfaces designed to support the weight of a vehicle passing thereover while resisting any shifting movement upon their engagement by the tires of the vehicle.

19 Claims, 2 Drawing Sheets

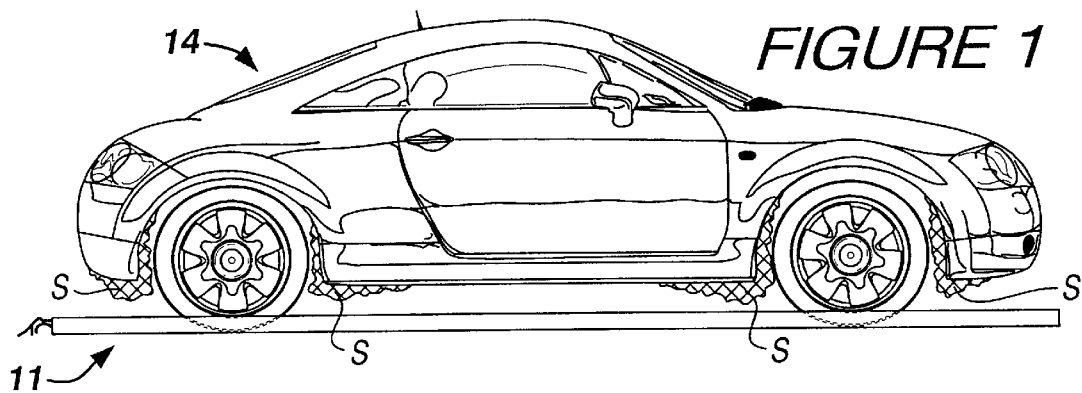
FIGURE 1
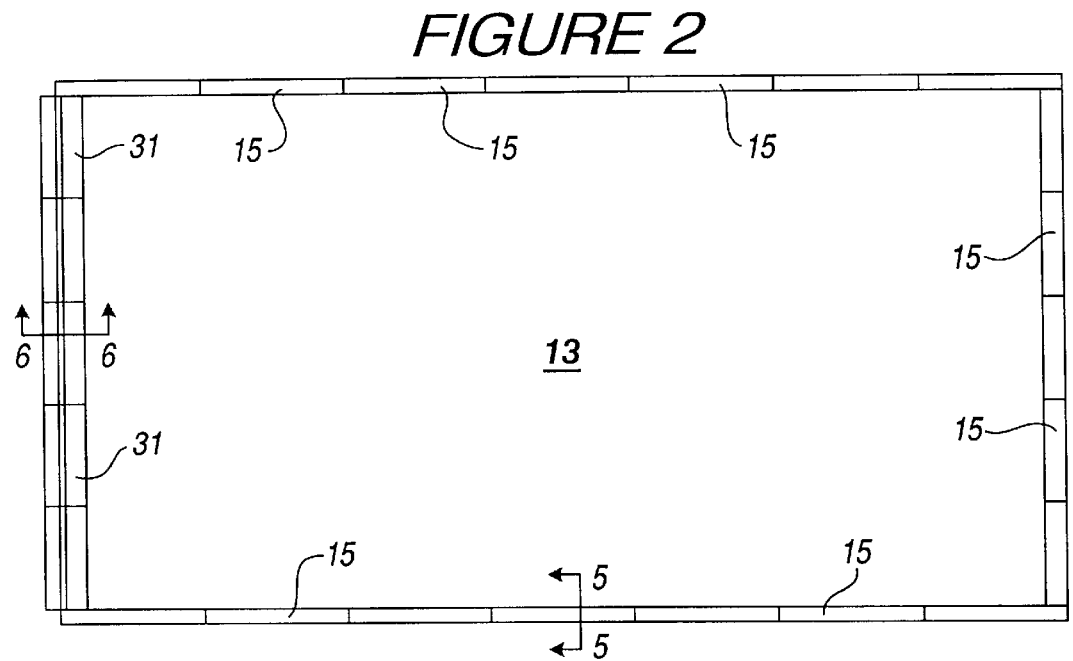
FIGURE 2
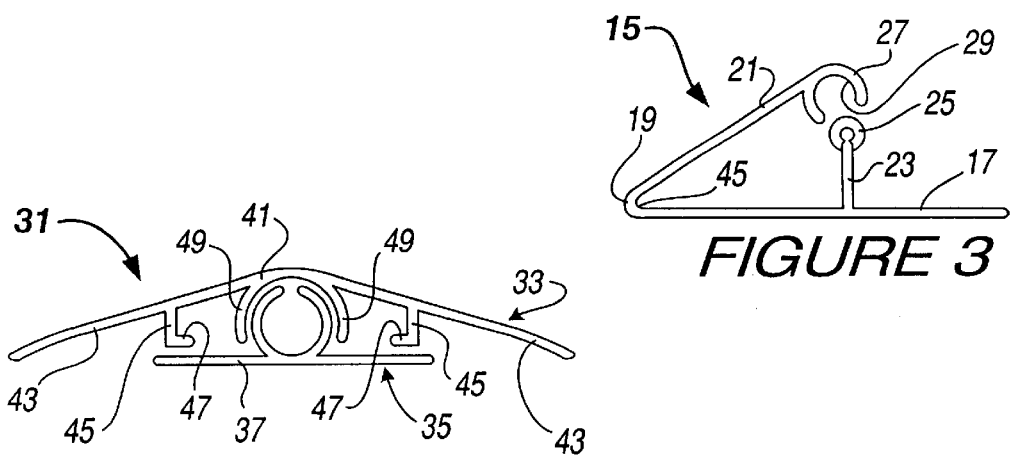
FIGURE 3
FIGURE 4

PORABLE PARKING MAT AND BERM

FIELD OF THE INVENTION

This invention relates to parking mats for disposition on the floor in the area where a vehicle will normally be parked, and more particularly to a portable parking mat and berm which is simple to assemble and install and which securely retains even large amounts of drippings from a vehicle parked within the bounds of the mat.

BACKGROUND OF THE INVENTION

Indoor parking in attached garages is prevalent in single family homes and condominiums throughout the United States. Typically, such indoor parking structure is attached to the residence itself so the driver can enter the residence after parking the vehicle without returning outdoors. However, vehicles parked in a garage frequently carry mud and dirt with them, and in regions in the northern part of the United States, as well as in mountainous regions, will frequently become caked with snow, sand, salt and other chemicals used to keep the highways passable which will then drip onto the floor of the garage as the vehicle warms and the snow and ice melt. As a result, such environmental drippings as well as crankcase and other lubrication and/or fluid drippings will accumulate on the garage floor beneath the vehicle and have a tendency to spread by gravity throughout the garage. As a result, drivers and passengers moving to and from the vehicle will have a propensity to track such water, dirt and other contamination into the living spaces of the residence itself.

U.S. Pat. No. 5,308,670 to Saylor discloses a floor cover for disposition under a parked vehicle. The floor cover is proportioned to have a size larger than the size of the vehicle and has a raised edge around the cover creates a basin to collect and retain melting snow, water and dirt falling from the vehicle. The raised edge is formed by inserting a rubber hose in a folded edge region that forms the perimeter of the cover. There are openings at the four corners, and compression under the wheels of a vehicle would also momentarily breach the reservoir.

U.S. Pat. No. 5,556,692 discloses a parking pad in the form of an elongated flat board with raised sides that are used in pairs to form a guiding track for the vehicle to move along. The central region below the vehicle is unprotected.

U.S. Pat. No. 5,916,658 shows a drip-catching mat having sidewalls that are raised to create a reservoir for holding liquid and debris, particularly dripping oil. A small version has a handle that allows the mat to be appropriately positioned beneath a parked vehicle. A larger embodiment of the mat is of a width to fit between the vehicle wheels and includes a pair of extensions that extend from opposite sides of the mat to correctly position the tires of the vehicle so the mat will be in the appropriate location therebelow. It is made of one-piece rubber construction, that would bend when a vehicle was driven over any edges, but is not suited for overall coverage simply because of size alone.

U.S. Pat. No. 5,948,250 shows a containment device construction designed to be appropriately positioned below a vehicle or in any location where leakage is anticipated. A central synthetic flooring is surrounded by four walls that are provided by elongated strips, each of which provides a channel, the cavity of which is filled with a hydrophobic absorbent material. Holes in the sidewalls allows liquids to enter the channel cavities where hydrocarbons are absorbed while water is allowed to drain via outer holes. Thus, the device would not be effective to prevent the spread of water from copious amounts of melting snow and ice that one would wish to retain so it would not be tracked into living space.

None of the mats and pads disclosed by the foregoing patents provides a totally satisfactory parking mat and berm particularly one that can be easily installed and reliably used on the floor of an attached garage. Thus, the search has continued for improved versions of devices of this general type.

SUMMARY OF THE INVENTION

The invention provides an improved portable parking mat and berm which can be easily assembled and dismantled and which provides leak-free retention of liquids dripping from a parked vehicle. The combination of a strong, flexible floor pad or sheet and four separate edge modular structures that raise the four free edges of the rectangular sheet a desired minimum height above the garage floor creates a collection basin which securely retains all such drippings while normal evaporation takes place without the danger of leakage at any location along the perimeter, particularly at the corners.

BRIEF DESCRIPTION OF THE DRAWINGS

FIG. 1 is a side elevation view showing a vehicle parked on a parking mat and berm embodying various features of the invention.

FIG. 2 is a plan view of the parking mat and berm illustrated in FIG. 1.

FIG. 3 is an end view, enlarged in size, of one of the modular pieces that together provide the elevated side edges of the embodiment shown in FIG. 1.

FIG. 4 is an end view of a pair of interfitting pieces that provide the elevated entrance end of the illustrated embodiment of FIG. 2.

DETAILED DESCRIPTION OF THE PREFERRED EMBODIMENTS

Figure 5:
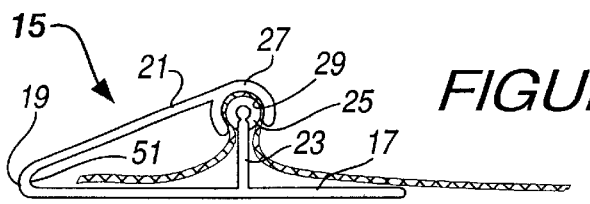
FIG. 5 is a cross-sectional view, enlarged in size, taken generally along the line 5—5 of FIG. 2.

As seen in FIGS. 1 and 2, a parking mat and berm 11 is provided that is sized to accommodate an automotive vehicle which would be parked thereupon in a covered garage, particularly one that is attached to a residence and has a connecting door so the driver and passengers can enter the residence from the garage without having to again step outdoors. One primary component is a large rectangular flexible synthetic sheet 13 which serves as the floor of the device. It is impervious to liquids, including water and hydrocarbons, and is chosen so as to be substantially unaffected by roadway chemicals, including salts and other deicing compounds. It should be both flexible and tough so as to withstand years of use beneath an automotive vehicle and to allow a vehicle to be repeatedly driven over it without crazing or cracking. Suitable flexible polymeric sheeting include those made from polyvinyl chloride (PVC), polyethylene, polypropylene, synthetic rubber and the like may be used; PVC is preferred. For example, PVC sheeting between about 5 mils and 50 mils in thickness may be used, and preferably PVC sheeting about 20 mils thick is employed.

The two lateral sides and the entrance and head ends of the rectangular sheet 13 are elevated through the use of appropriate structures that securely grasp or grip the four edges of the rectangular sheet 13 and create a central basin. Those edges are elevated a desired minimum height above the floor so as to securely retain in such basin even extraordinary amounts of melting snow and ice that might be carried into a garage by a vehicle 14 being operated in winter during heavy snow conditions. Such typical accumulations of snow and ice which carry dirt and other roadway contamination occur in and adjacent the wheel wells and are marked "S" in FIG. 1. These side and end structures are modular, being preferably provided in sections having specific lengths so that, when put together in end-to-end alignment, they provide an overall device 11 having the desired length and width dimensions.

As best seen in FIGS. 3 and 4, the side and entrance end structures are of different constructions. The side structures 15 are shown in end view in FIG. 3. They have an integral one-piece construction which can be conveniently fabricated by extrusion using a suitable material that is resistant to corrosion from salt, oils, etc. and has sufficient resiliency to flex at a hinge location but sufficient stiffness to lock together in the region of two interengageable parts. Polymeric resins are preferred, and suitable polymeric resins meeting these parameters are well known in the modern day plastics art and may be used to extrude the side edge structures. The preferred material is ABS resin, which is made from a blend of acrylonitrile-butadiene-styrene resins; it provides the desired stability and flexibility. More specifically, as shown in FIG. 3, the modular side structures 15 include a flat base 17 that at one end has an integral hinge 19 that serves as a flexible joint where the outer edge of the base plate 17 is joined to a sloping cover wall 21. A vertical flange 23 extends upward from a generally central portion of the base 17 and extends longitudinally of the structure. The flange 23 terminates in an elongated cylindrical bead 25 of circular cross-section which may be solid or have a hollow interior. Formed at the undersurface of the upper end of the sloping cover wall 21 is a channel-like member 27 having a pair of arcuate walls so as to render it generally C-shaped in cross-section. The channel-like member 27 provides an interior cavity 29 that is proportioned to fit about the bead 25 and securely interengage therewith when the thickness of an edge portion of the polymeric sheet 13 is disposed therebetween.

As best seen in FIG. 4, the modular entrance end structures 31 are of two-piece construction. They comprise upper and lower separate pieces 33 and 35 that also interengage with each other in a manner so as to securely grip an edge of the rectangular sheet 13 and securely elevate it a desired minimum distance above the floor. The upper and lower pieces are likewise designed so that they may suitably extrude using an appropriate polymeric material that has good strength and rigidity along with some resiliency; however, resiliency is not a major factor as it is in the structures 15 where the hinge section 19 is subjected to some stress when the interengagement occurs to lock the edge of the sheet in place.

More specifically, the lower piece 35 includes a flat base plate 37, the upper surface of which has integrally formed therewith a split or interrupted tube which includes a pair of oppositely curved arms 39. This tubular structure has some resiliency as a result of the arms being able to deflect slightly toward each other and thus slightly shrink the diameter of the interrupted tube. The upper and lower pieces 33, 35 are preferably extruded from material having good strength and resistance to salt and other common chemicals. Although aluminum or a variety of polymers well known in this art might be used, the preferred material is dense, relatively rigid PVC which has the desired characteristics from the standpoints of strength, resiliency and corrosion-resistance.

The upper pieces 33 include a major upper wall surface in the form of an inverted V-shaped ramp 41 formed by a pair of legs or sloping walls 43 that are of equal length, each of which has a short vertical flange 45 depending from its undersurface. Formed at the lower end of these short flanges are a pair of sole plates 47 which are designed to abut the upper surface of the base plate 37 of the lower piece when there is deflection downward, as when a vehicle passes over the end structure 31. Depending from the central portion of the undersurface of V-shaped ramp of the upper piece are a pair of oppositely curved arms 49 that are proportioned and spaced to effect the interengagement between the upper and lower pieces 33, 35 by snapping about the tubular portion 39 of the lower piece with an end edge portion of the sheeting sandwiched therebetween. The design of the oppositely curved arms 49 such that they can deflect slightly outward as they snap downward over the mating tubular section 39 of the lower piece 35 to securely lock the end edge of the sheet 13 therebetween.

The overall modular construction of the four edge structures is such that such mat and berm devices can be easily provided in shorter, longer and/or wider rectangular shapes by simply adding or subtracting one modular section from the group that makes up each lateral side support or each end support. For example, the side structure sections may be provided in lengths of two feet, and the end structure sections provided in lengths of about 18 inches as a positive deterrent to any potential initial misalignment. The mat can be readily and simply assembled simply by spreading the flexible sheet 13 onto the garage floor in the location desired where the vehicle will be normally parked. The side structure 15 design provides a locator to facilitate correct positioning of the modular pieces. The vehicle owner is able to easily assure straight alignment of the plurality of side structures 15 by simply locating the edge of the sheeting 13 so that it abuts the surface of a crotch 51 provided by the interior of the hinge section of each side structure. With all of the sections of the side structure 15 so in place and aligned in end-to-end relationship by these built-in locators, the interengaging parts are simply snapped together by pressing downward or softly stepping on the sloping cover walls 21 to cause the C-channel elements 27 to snap over the beads 25 and lock the lateral edge portion of the sheeting securely therebetween, as shown in FIG. 5.

Figure 6:
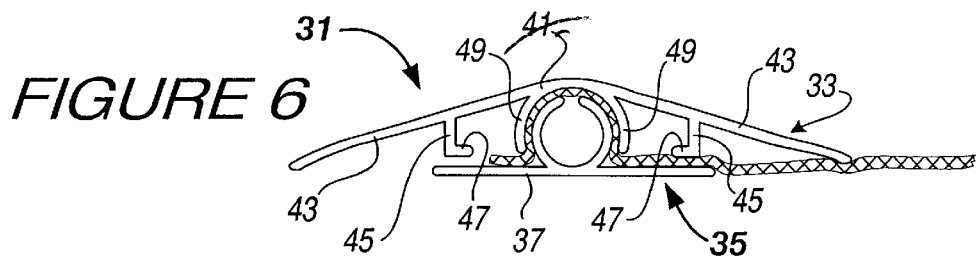
FIG. 6 is a cross-sectional view, enlarged in size, taken generally along the line 6—6 of FIG. 2.
Figure 7:
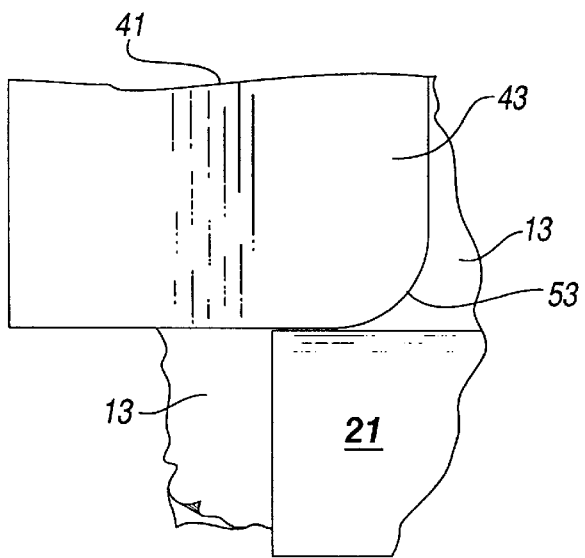
FIG. 7 is a fragmentary plan view, enlarged in size, of one corner of the embodiment of FIG. 2.
Figure 9:
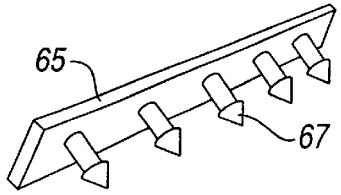
FIG. 9 is a perspective view of one component from FIG. 8.

Once both parallel side structures are in place, the entrance end structures, which are of different modular lengths than the side structures, e.g. 18 inches versus 24 inches, are attached along the edge of the rectangular sheet 13 adjacent the entrance to the garage. This is the section of the mat and berm over which the vehicle will be driven, and thus it is important that the end structures 31 be located in this region. If, for example, the mat is 7½ feet wide, five modular sections of end structures 31 each 18 inches long will be supplied. The five lower pieces 35 are laid out so that the edge of the sheeting 13 extends over the upstanding split tubular elements 39, and at both corners, the base plates 37 are preferably positioned to reside below the bases 17 of the side structures that are already in place so they will be in contact with the garage floor. Straight end-to-end alignment of the five sections is easily achieved by simply aligning the outer edges of the five base plates. Next the five complementary upper pieces 33 are carefully positioned over the lower pieces 35 with the ends of the curved arms 49 that flank the opening resting on the upper surface of the sheet 13 immediately above the tubular element 39. With all five pieces in place, force is applied to the upper surface of each by pushing down or carefully softly stepping on the T-shaped ramp surface of the upper pieces 33 causing the interengaging parts to snap together with the edge of the sheet 13 securely gripped between the interengaging, slightly resilient elements as shown in FIG. 6. This arrangement assures that the entrance edge of the sheeting 13 will be elevated above the garage for a distance equal to the height of the split tubular element, thus preventing liquids from exiting the basin provided by the mat and berm at the end entrance. Because the edge of the interior sloping wall 43 of the V-shaped ramp will be in contact with the upper surface of the sheeting, the corners of the interior sloping cover walls that make up the V-shaped ramp are curved as shown in FIG. 7 so there will be no danger of potentially penetrating through the flexible sheeting.

The other or head end of the mat may also be provided by five of the structures 31 as used at the entrance end if desired. However, because the head end structures need not be designed to support the weight of a vehicle traveling thereover, it may be preferable to simply use five side structure sections 15 which can be very easily installed using the locator function provided by the crotch 51 in these integral pieces. If the latter arrangement is used, then five 18-inch sections of structures 15 are supplied along with the five 18-inch sections of the end structures 31. This arrangement of different modular lengths allows the vehicle owner to easily see that it is these five shorter sections of the structures 15 that are to be appropriately installed at the head end of the parking mat and berm, which can of course be easily accomplished after the two side structures have been installed.

Overall, there is provided a portable mat and berm arrangement that can be easily slid along a garage floor surface because, although the sheet is flexible, the four edge structures once installed have excellent rigidity when installed in abutting end-to-end relationship because each locks onto the edge portion of the sheet, providing substantial stability to the overall structure. Thus, if used in a single family residence, it would facilitate the owner sliding the structure, on an appropriately sunny day during the summer months, onto the adjoining driveway to permit it to be hosed off and dried in the sunshine. Moreover, the construction is such that it can be conveniently marketed in kit form that contains a folded flexible sheet that provides the mat being packaged along with a plurality of 24-inch long modular side structures and 18-inch long modular end components that facilitate easy installation in a parking area.

Figure 8:
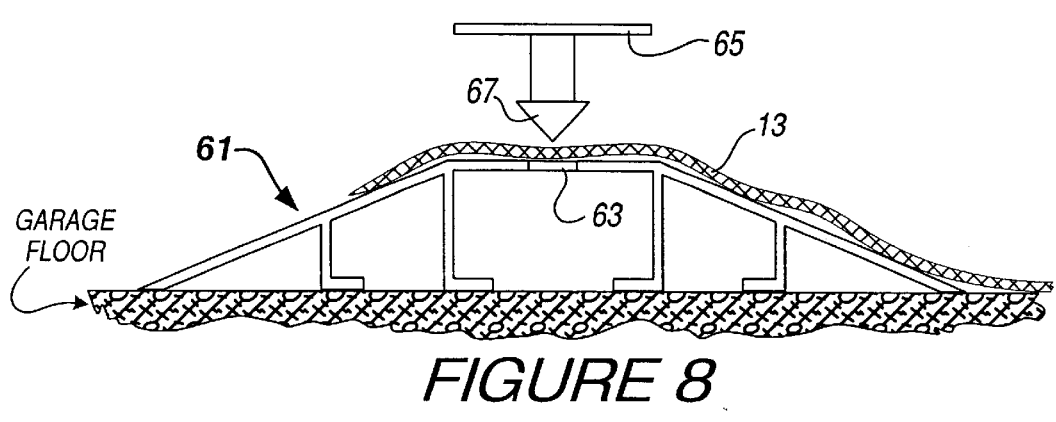
FIG. 8 is an exploded sectional view of an alternative embodiment of an edge structure similar to those shown in FIGS. 3 and 4.

Although the invention has been described with regard to certain preferred embodiments which constitute the best mode presently known to the inventor for carrying out this invention, it should be understood that the various changes and modifications as would be obvious to one having the ordinary skill in the art may be made without deviating from the scope of the invention as set forth in the claims appended hereto. For example, although the illustrated side structures 15 are believed to have particular advantages because of their integral construction that permits the accurate and quick assembly, other two-piece constructions could alternatively be used along the edges of such a mat and berm device. For example, a construction such as shown in FIG. 8 might be employed wherein a suitable box girder-like type structure 61 might be employed that optionally has one or a pair of sloping walls. If this arrangement were used as the entrance end structure, the sloping walls would preferably have depending flanges and sole plates as depicted, and as incorporated in the structures 31. The upper surface of the box girder structure might be formed either with an elongated slot or, more preferably, with a series of uniformly spaced apart round holes 63. The edge of the flexible sheeting 13 would then be draped across the upper surface thereof as schematically depicted, and it would be secured in place through the use of short flat strips 65 that carry depending prongs 67. These strips 65 may be injection molded or otherwise formed of polymeric material and would carry a series of prongs 67 having tapered heads of circular cross-section depending from the undersurface thereof which have the same spacing as the holes 63 in the upper surface of the box girder. Accordingly, alignment of the prong-carrying strip 65 with a perforated section of the box girder structure 61 would permit the strip to be simply pushed downward to entrap the edge of the flexible sheeting 13 between the upper and lower juxtaposed flat surfaces when the heads of the prongs snap through the holes 63 and become engaged therein. Preferably, the sheeting would be made of material that would simply stretch and distend to form itself around the prong 67 when pushed through the circular hole so that the sheeting would preferably remain intact, although this would not be a requirement. Moreover, if desired, the prongs 67 could be provided with a central split to allow them to deflect radially inward and more easily enter the holes, and thereafter expand outwardly to securely remain therein. Furthermore, although it is preferred that these duplicate sections which make up the side structures are disposed with ends abutting one another, the overall arrangement would still function adequately if they were spaced apart from each other to allow short gaps in between so long as the edge of the sheet remained elevated in the region of the short gaps.

Particular features of the invention are emphasized in the claims that follow.

What is claimed is:

1. A portable parking mat and berm which comprises
a flexible, liquid-impervious sheet of generally rectangular shape having four free edges and a desired size to accommodate a wheeled vehicle parked upon the upper surface thereof on a garage floor, and
four separate edge structures that are each designed to grasp one of said free edge portions to raise said free edge portion a desired minimum height above the garage floor to create a collection basin for liquid dripping from the vehicle which extends over the upper surface of said flexible, liquid-impervious sheet,
each said edge structure being made of corrosion-resistant material having lockable parts which engage with each other in a manner so as to securely entrap said sheet edge portion therebetween, raising it the desired distance above the garage floor.

2. A mat and berm according to claim 1 wherein each of said four separate edge structures is made from a plurality of short duplicate sections that are aligned lineally to create one said edge structure.

3. A mat and berm according to claim 2 wherein said edge structure sections that constitute the two longitudinal edges of the rectangle are integral unitary structures comprising two interengageable parts that are connected to each other at a resilient flexible joint.

4. A mat and berm according to claim 3 wherein one of said parts is a longitudinally extending bead of generally elongated cylindrical shape and the other of said parts contains an elongated cavity sized to snap over said bead and lock said edge portion of said flexible sheet therebetween.

5. A mat and berm according to claim 1 wherein at least the transverse edge structure over which the vehicle will pass when entering or leaving the parking mat in the garage is made of sections which comprise an upper portion and a lower portion, said upper portion having an upper surface in the configuration of forward and rearward-facing ramps that extend diagonally downward from a central high point, and an undersurface that contains a third interengageable part that is positioned to lockingly engage with a fourth interengageable part carried by said lower portion.

6. A mat and berm according to claim 5 wherein said upper and lower portions are separate from each other, with said lower portion including a horizontal base flange having a generally centrally positioned, longitudinally extending hollow tubular part which serves as said fourth interengageable part and is carried by the upper surface of said base flange.

7. A mat and berm according to claim 6 wherein said upper portion has its lower surface formed to include a pair of oppositely curved arms that are proportioned to snap about said tubular part and entrap a free edge portion of said flexible sheet therebetween thereby constituting said third interengageable part.

8. A mat and berm according to claim 5 wherein said undersurface of said upper portion contains a pair of longitudinally extending supports, one of which depends from a generally central location on each ramp section so as to engage the upper surface of said base flange and support said ramp when the wheels of a vehicle are passing thereover.

9. A portable parking mat and berm which comprises
 a flexible, liquid-impervious sheet of generally rectangular shape having four free edges and a desired size to accommodate a wheeled vehicle parked upon the upper surface thereof on a garage floor, and
 edge structures along each of said free edge portions which raise said free edge portion a desired minimum height above the garage floor to create a collection basin for liquid dripping from the vehicle which extends over the upper surface of said flexible, liquid-impervious sheet,
 said edge structures including two side edge structures and two transverse edge structures, with said transverse edge structure over which the vehicle will pass when entering or leaving the parking mat in the garage being made of a plurality of short duplicate sections which each comprise an upper portion and a lower portion, said upper portion having an upper surface in the configuration of forward and rearward-facing ramps that extend diagonally downward from a central high point, and an undersurface that contains one interengageable part that is positioned to lockingly engage with another interengageable part which is carried by said lower portion,
 said interchangeable parts being engaged with each other so as to securely entrap said sheet edge portion therebetween, raising it the desired distance above the garage floor.

10. A mat and berm according to claim 9 wherein said upper and lower portions are separate units, with said lower portion including a horizontal base flange having a generally centrally positioned, longitudinally extending hollow tubular part which serves as said fourth interengageable part and is carried by the upper surface of said base flange.

11. A mat and berm according to claim 10 wherein said upper portion has its lower surface formed to include a pair of oppositely curved arms that constitute said third interengageable part and are proportioned to snap about said tubular part and entrap a free edge portion of said flexible sheet therebetween.

12. A mat and berm according to claim 11 wherein said undersurface of said upper portion contains a pair of longitudinally extending supports, one of which depends from a generally central location on each ramp section so as to engage the upper surface of said base flange of said lower portion and support said ramp when the wheels of a vehicle are passing thereover.

13. A kit for constructing a parking mat and berm, which kit comprises
 a flexible, liquid-impervious sheet of generally rectangular shape having four free edges and being of a desired size to accommodate a wheeled vehicle parked upon the upper surface thereof on a garage floor, and
 a plurality of separate modular edge structures that are each designed to grasp one of said free edge portions of said sheet to raise said free edge portion a desired minimum height above the garage floor to form a perimeter berm and create a collection basin for liquid dripping from the vehicle which is parked upon the upper surface of said flexible, liquid-impervious sheet,
 each said edge structure being made from a plurality of short duplicate sections that are designed to be lineally aligned to create one said edge structure of a perimeter berm, said sections being made of corrosion-resistant material and having lockable parts which engage with each other in a manner so as to securely entrap said sheet edge portion therebetween and raise it a desired distance above the garage floor, and
 the modular structures which together form the two lateral sides of said berm being of one length and the modular structures which together form the entrance and head ends of said berm being of substantially different lengths so as to be readily distinguishable.

14. A kit according to claim 13 wherein said edge structure sections that will form the two longitudinal edges of the rectangle are integral unitary structures made of polymeric material, with each comprising two interengageable parts that are connected to each other at a resilient flexible joint.

15. A kit according to claim 14 wherein one of said parts is a longitudinally extending bead of generally elongated cylindrical shape and the other of said parts contains an elongated cavity sized to snap over said bead and lock said edge portion of said flexible sheet therebetween.

16. A kit according to claim 15 wherein at least said duplicate sections which comprise the entrance edge structure over which the vehicle will pass when entering or leaving the parking mat in the garage each include an upper portion and a lower portion, said upper portion having an upper surface in the configuration of forward and rearward-facing ramps, that extend diagonally downward from a central high point, and an undersurface that contains a third interengageable part that is positioned to lockingly engage with a fourth interengageable part carried by said lower portion.

17. A kit according to claim 16 wherein said upper and lower portions are separate from each other, with said lower portion including a horizontal base flange having a generally centrally positioned, longitudinally extending hollow tubular part carried by the upper surface of said base flange which serves as said fourth interengageable part.

18. A kit according to claim 17 wherein said upper portion has its lower surface formed to include a pair of oppositely curved arms that are proportioned to snap about said tubular part and entrap a free edge portion of said flexible sheet therebetween thereby constituting said third interengageable part.

19. A kit according to claim 18 wherein said undersurface of said upper portion also has integrally formed therewith a pair of longitudinally extending supports, one of which depends from a generally central on each ramp section so as to engage the upper surface of said base flange and thereby support said ramp section when the wheels of a vehicle are passing thereover.

* * * * *